Aug. 23, 1966  K. RAAB  3,267,828
MECHANISM FOR VARYING THE FOCAL LENGTH OF PHOTOGRAPHIC
OR CINEMATOGRAPHIC OBJECTIVES OR THE LIKE
Filed Sept. 27, 1962  2 Sheets-Sheet 1
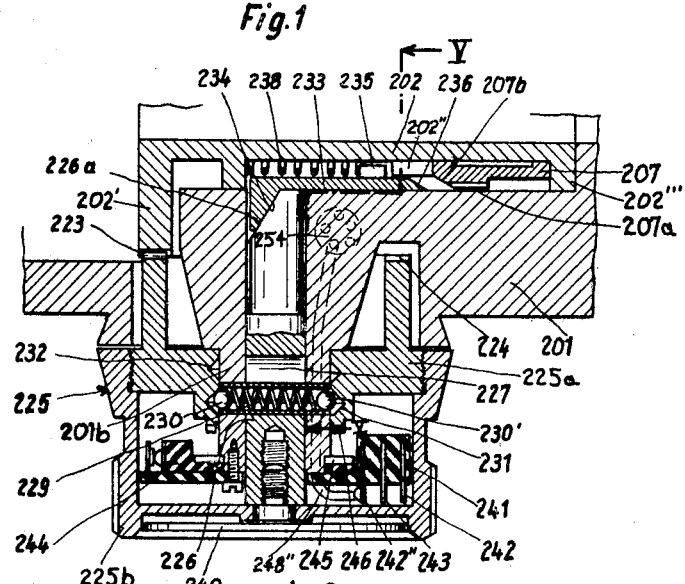
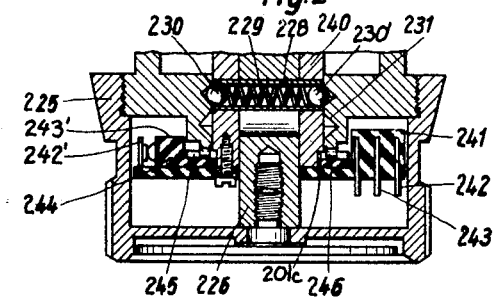
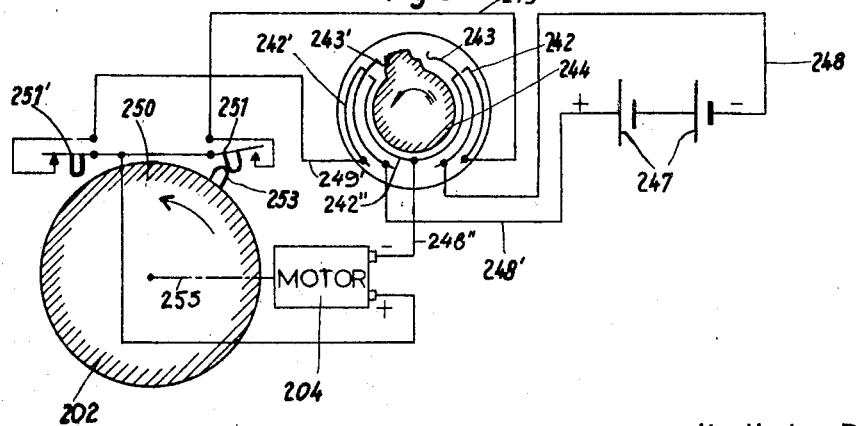
Karlheinz Raab
*Inventor:*
*Karl F. Ross*
AGENT.

United States Patent Office 3,267,828
Patented August 23, 1966

3,267,828
MECHANISM FOR VARYING THE FOCAL LENGTH OF PHOTOGRAPHIC OR CINEMATOGRAPHIC OBJECTIVES OR THE LIKE
Karlheinz Raab, Bad Kreuznach, Germany, assignor to Jos. Schneider & Co. Optische Werke, Bad Kreuznach, Rhineland, Germany, a corporation of Germany
Filed Sept. 27, 1962, Ser. No. 226,691
Claims priority, application Germany, Dec. 15, 1960, Sch 30,436
5 Claims. (Cl. 95—45)

My present invention relates to a photographic or cinematographic camera whose objective has one or more components that are axially movable for the purpose of varying its focal length.

It has already been proposed to provide means for automatically shifting such objective components, e.g. with the aid of a reversible electric motor as more fully disclosed in commonly assigned application Ser. No. 132,029 filed August 17, 1961, by Paul Himmelsbach. It is often desirable, however, to provide means for manually changing the focal length while leaving the automatic drive inoperative.

In my copending application Ser. No. 158,306, filed December 11, 1961, now Patent No. 3,095,794, of which the present application is a continuation-in-part, I have disclosed the provision of a manually movable control member on a generally cylindrical objective housing, such as a handle swingable about the housing axis or a knob rotatable in a plane parallel to this axis, which in one position is displaceable to adjust the axial position of an optical component mechanically coupled therewith and in another position is decoupled from such component to permit its independent adjustment by automatic means. In the specific embodiment utilizing a rotatable knob as the control member, this knob is shiftable along its own axis (radially of the objective housing) between two mutually parallel positions, i.e. the coupled and the decoupled position mentioned above.

Whereas with my prior system the automatic drive for the movable objective component or components was to be set in motion by separate switch means, it is the general object of my instant invention to provide an improved arrangement of this type wherein the drive can be started and stopped by the control member itself in its decoupled position. The resulting elimination of special pushbuttons or the like simplifies the construction of the mechanism and renders its operation considerably more convenient to the user.

The foregoing object is realized, in accordance with my invention, through the provision of one or more contacts engageable by the control member in its decoupled position for closing the energizing circuit of the drive motor. Advantageously, where the control member is represented by a rotatable knob, the latter when thus engaged is normally maintained in a neutral angular position by suitable resilient means (e.g. the contact elements themselves) and completes a circuit for energizing the drive motor, in one or the other direction of displacement, only upon being manually urged out of this normal position in one sense or the other. Limit switches may be used to break the energizing circuit of the drive motor in a terminal position of the adjustable component to render the system foolproof.

The invention will be described in greater detail with reference to the accompanying drawing in which:

FIG. 1 is a fragmentary sectional view, similar to FIG. 4 of my copending application, of a camera objective embodying the invention;

FIG. 2 shows part of the mechanism of FIG. 1 in an alternate position of its control member;

FIG. 3 is a circuit diagram relating to the system of FIGS. 1 and 2;

Figure 4:
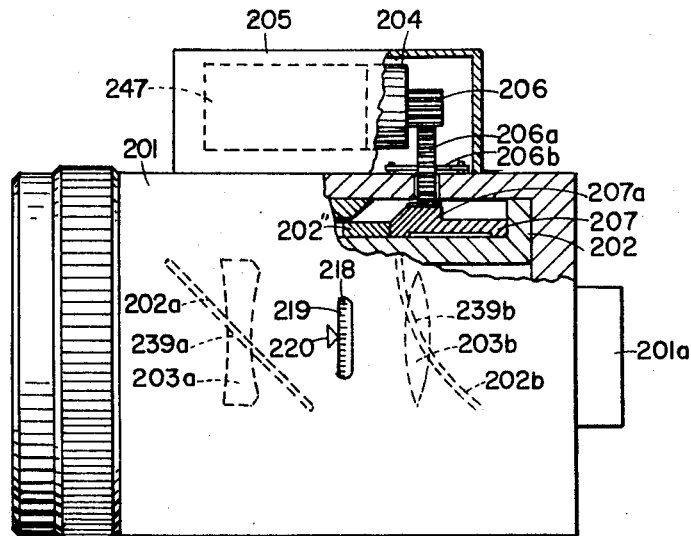
FIG. 4 is a side-elevational view (parts broken away) of the overall objective.
Figure 5:
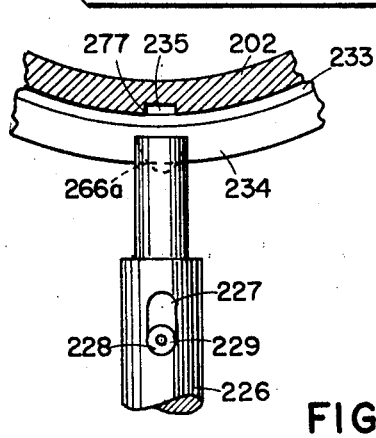
FIG. 5 is a cross-sectional view taken substantially on line V—V of FIG. 1.

The camera objective, best shown in FIG. 4, comprises a housing 201 with a rearward extension 201a whereby it may be attached in the conventional manner to a photographic or cinematographic camera not shown. A control sleeve 202 is coaxially and rotatably mounted in housing 201 and is provided with a pair of camming slots 202a, 202b which mate with respective radial studs 239a, 239b on a pair of axially movable objective lenses 203a, 203b. The lenses 203a and 203b, which form part of an assembly whose remaining stationary components are not shown, are held by suitable means not further illustrated against rotation within sleeve 202 and are guided for displacement along the axis thereof.

A motor 204 is disposed in a casing 205 on the exterior of housing 201 and has a pinion 206 which drives the ring gear 207 through the intermediary of a spur gear 206a provided with a shaft 206b. Ring gear 207, whose gear teeth meshing with those of pinion 206 have been designated 207a, has a beveled surface 207b (FIG. 1) by which it can be frictionally coupled with the sleeve 202 in a manner more fully described hereinafter. Upon such coupling, the rotation of gear 207 by the motor 204 is transmitted to the control sleeve 202 so as to cause an axial displacement of the lenses 203a, 203b at a rate determined by the slope of slots 202a, 202b. Housing 201 has a window 218 through which a scale 219 on sleeve 202 is readable, this scale coacting with a mark 220 to indicate the focal length of the objective system in each position of adjustment.

The control sleeve 202 has a flange 202' with gear teeth 223 which in the position of FIG. 1 mate with gear teeth 224 on a cup-shaped inner portion 225a, threadedly connected with a similarly shaped outer portion 225b of an actuating knob 225. This knob has a stem 226 to which it is fastened by a screw 240 and which is formed with an oblong transverse bore 227 traversed by a tubular stud 228. A compression spring 229 in stud 228 bears upon two balls 230, 230' adapted to enter either of two annular grooves 231, 232 in knob portion 225a; in the position of FIG. 1, which corresponds to manual control, the balls 230, 230' are received in the outer groove 231. It will be understood that the relative position of motor housing 205 and knob 225 on the periphery of housing 201 may be different from that illustrated in FIG. 4.

Stem 226 has a beveled end 226a in camming engagement with a frustoconical surface 234 on a coupling ring 233. This ring has a radially inwardly projecting lug 235 which is receivable in a peripheral slot 237 of an annular shoulder 202" of sleeve 202, the latter together with another flange 202''' defining a clearance of the driven gear 207 whose beveled surface 207b faces a similar surface 236 of ring 233. In the coupled position of knob 225 shown in FIG. 1, in which the gear teeth 223 mate with the gear teeth 224 for manual entrainment of sleeve 202, ring 233 is cammed out of contact with gear 207 by the beveled edge 226a of stem 226; at the same time the lug 235 is freed from the slot 237 so that sleeve 202 can rotate under the control of knob 225 even though ring 233 may be frictionally held against rotation by its engagement with the beveled edge 226a. A helical compression spring 238, anchored to lug 235, is deformed under these circumstances in both an axial and a torsional sense.

When it is desired to switch to automatic operation, knob 225 is radially withdrawn in an outward direction whereby the ball checks 230, 230' come to rest in the inner groove 232 thereof. Gear teeth 224 of knob 225 are now disengaged from gear teeth 223 of sleeve 202 while the beveled edge 226a of stem 226 releases the camming surface 234 of ring 233; spring 238 is thus enabled to rotate the ring 233 back into proper alignment of its lug 235 with slot groove 237 and thereupon to drive this lug into the slot, thereby also establishing frictional contact between surfaces 236 and 207b so that the members 207, 233 and 202 rotate in unison under the control of motor 204 when the latter is energized in the manner about to be described. Naturally, the lug 235 and the slot 237 are representative of a wide variety of coacting formations for positively or otherwise coupling the sleeve 202 with the ring 233 while the latter engages the gear 207.

An extension 201b of housing 201 forms a stationary support for an insulating carrier plate 241 fixedly secured to it within the space defined by knob portions 225a and 225b. Carrier plate 241 supports a set of contact springs 242, 242', 242'', 243 and 243' (see also FIG. 3) connected by their projecting fixed extremities, via leads 248, 248', 248'', 249 and 249', to a control circuit for motor 204 including a terminal box 254 as specifically illustrated in FIG. 1 for the lead 248''. Also mounted on plate 241, for free rotation about the boss 201b, and held against axial displacement by a shoulder 201c on the latter is an insulating camming element 244 adapted to co-operate with the free extremities of contact springs 243, 243'; these contact springs normally tend to maintain the cam 244 in a neutral position in which they engage the common central contact 242'' and are insulated from contacts 242 and 242', respectively. Cam 244 has a hub provided with gear teeth 245 which in the withdrawn or decoupled position of knob 225 (FIG. 2) are engaging by mating teeth 246 on knob portion 225a whereby the knob and the cam are interconnected for joint angular displacement.

If the cam 244 is swung counterclockwise from its neutral position as has been illustrated in FIG. 3, contacts 242', 243' make and complete a circuit in series with a power source 247 for the energization of motor 204 in a sense causing counter-clockwise rotation of sleeve 202 as viewed in this figure. This energizing circuit can be traced from the positive terminal of power source 247 through lead 248', contacts 243', 242', lead 249', a normally closed circuit breaker 251', a conductor 250, motor 204, lead 248'', contacts 242'', 243 and lead 248 to the negative terminal of the source. When the sleeve 202 (and, therefore, each of the lenses 203a, 203b) has reached a terminal position, a limit switch in the form of a lug 253 thereon opens the circuit breaker 251' to stop the motor. Similarly, if cam 244 is swung clockwise in FIG. 3, a circuit for clockwise rotation of sleeve 202 is completed from positive battery through lead 248', contacts 243', 242'', lead 248'', motor 204, lead 250, a circuit breaker 251 (if closed), lead 249, contacts 242, 243 and lead 248 to negative battery; circuit breaker 251 operates to arrest the sleeve in its alternate terminal position under the control of lug 253. The linkage between motor 204 and sleeve 202, indicated schematically at 255 in FIG. 3, represents of course the assembly 206, 206a, 207, 233 which is effective in the withdrawn position of knob 255 (FIG. 2) to couple the motor to the sleeve. Source 247 has been schematically illustrated as a pair of batteries which, in a practical embodiment, may be physically positioned alongside the motor 204 in housing 205 as indicated in FIG. 4.

It will be evident that the system described above is readily adaptable for use with a variety of varifocal optical objectives and attachments therefor and that modifications of the arrangement specifically disclosed are possible and will be apparent to persons skilled in the art, hence such modifications are intended to be included in the scope of the invention as defined in the appended claims.

I claim:

1. In a camera objective having a housing and at least one optical component axially displaceable in said housing, in combination, automatic drive means for said component, control means in engagement with said component, a manually rotatable member on said housing shiftable between a first position and an alternate second position parallel to said first position, said member engaging said control means in said first position for displacing said component upon rotation of said member, coupling means spring-urged into establishment of an operative connection between said drive means and said control means for automatic displacement of said component upon a shifting of said member into said second position in which said member is disengaged from said control means, said member upon re-engaging said control means overcoming the spring force of said coupling means for breaking said connection, and switch means controllable by said member in said second position for energizing said drive means by rotation of said member.

2. In a camera objective having a generally cylindrical housing and at least one optical component axially displaceable in said housing, in combination, automatic drive means for said component, a rotatable sleeve in said housing having a camming formation in engagement with said component, a manually movable member on said housing shiftable between a first position and an alternate second position parallel to said first position, said member engaging said sleeve in said first position for displacing said component upon rotation of said member, coupling means spring-urged into establishment of an operative connection between said drive means and said sleeve for automatic displacement of said component upon a shifting of said member into said second position in which said member is disengaged from said sleeve, said member upon re-engaging said sleeve overcoming the spring force of said coupling means for breaking said connection, and switch means controllable by said member in said second position for energizing said drive means by rotation of said member.

3. In a camera objective having a generally cylindrical housing and at least one optical component axially displaceable in said housing, in combination, automatic drive means for said component, a rotatable sleeve in said housing having a camming formation in engagement with said component, a knob manually rotatable on said housing in a plane substantially parallel to the sleeve axis and shiftable generally radially of said housing between a first position and an alternate second position, said knob engaging said sleeve in said first position for displacing said component upon rotation of said knob, coupling means spring-urged into establishment of an operative connection between said drive means and said sleeve for automatic displacement of said component upon a shifting of said knob into said second position in which said knob is disengaged from said sleeve, said knob upon re-engaging said sleeve overcoming the spring force of said coupling means for breaking said connection, and switch means controllable by said knob in said second position for energizing said drive means by rotation of said knob.

4. The combination according to claim 3 wherein said drive means comprises a reversible motor, said housing being provided with a generally radial extension supporting said knob, said switch means including a pair of reversing contacts mounted within said knob on said extension and cam means on said extension angularly entrainable in either sense by said knob upon rotation thereof in said second position for energizing said motor with corresponding direction of rotation through a respective reversing contact.

5. The combination according to claim 4, further comprising a pair of limit switches connected in circuit with said reversing contacts and responsive to a formation on said sleeve for de-energizing said motor in respective terminal positions of said component.

References Cited by the Examiner
UNITED STATES PATENTS

| | | | |
|---|---|---|---|
| 2,607,265 | 8/1952 | Petrucelli | 95—45 X |
| 3,095,794 | 7/1963 | Raab | 95—45 |

JOHN M. HORAN, *Primary Examiner.*

NORTON ANSHER, JOSEPH P. STRIZAK,
*Examiners.*